United States Patent
Ramachandra Iyer

(10) Patent No.: US 11,100,693 B2
(45) Date of Patent: Aug. 24, 2021

(54) METHOD AND SYSTEM FOR CONTROLLING AN OBJECT AVATAR

(71) Applicant: Wipro Limited, Bangalore (IN)

(72) Inventor: Manjunath Ramachandra Iyer, Bangalore (IN)

(73) Assignee: Wipro Limited, Bangalore (IN)

( * ) Notice: Subject to any disclaimer, the term of this patent is extended or adjusted under 35 U.S.C. 154(b) by 257 days.

(21) Appl. No.: 16/276,663

(22) Filed: Feb. 15, 2019

(65) Prior Publication Data

US 2020/0211247 A1 Jul. 2, 2020

(30) Foreign Application Priority Data

Dec. 26, 2018 (IN) .............................. 201841049215

(51) Int. Cl.
*G06T 13/20* (2011.01)
*G06F 9/451* (2018.01)
*G10L 15/18* (2013.01)
*G10L 15/26* (2006.01)
*G06F 3/16* (2006.01)
*G10L 15/22* (2006.01)
*G06T 13/80* (2011.01)

(52) U.S. Cl.
CPC ............ *G06T 13/205* (2013.01); *G06F 3/167* (2013.01); *G06F 9/453* (2018.02); *G06T 13/20* (2013.01); *G06T 13/80* (2013.01); *G10L 15/18* (2013.01); *G10L 15/22* (2013.01); *G10L 15/26* (2013.01)

(58) Field of Classification Search
CPC ....... G10L 15/22; G06F 3/167; G06T 13/205; G06T 13/20; G06T 13/80
See application file for complete search history.

(56) References Cited

U.S. PATENT DOCUMENTS

| 5,717,415 A * | 2/1998 | Iue .................... H04N 13/167 345/8 |
| 6,208,359 B1* | 3/2001 | Yamamoto ............ G06T 13/205 345/473 |
| 6,507,833 B1 | 1/2003 | Hichwa et al. |
| 9,478,064 B2 | 10/2016 | Bosscher et al. |
| 2002/0032702 A1* | 3/2002 | Horii ...................... G10L 15/26 715/203 |
| 2006/0047520 A1* | 3/2006 | Gong ...................... G10L 13/00 704/278 |
| 2006/0079325 A1* | 4/2006 | Trajkovic ................ G10L 21/06 463/31 |

(Continued)

OTHER PUBLICATIONS

Extended European Search Report issued in the European Patent Office in counterpart European Application No. 19166388.9, dated Jul. 17, 2019. 10 pages.

*Primary Examiner* — Samuel G Neway
(74) *Attorney, Agent, or Firm* — Finnegan, Henderson, Farabow, Garrett & Dunner, LLP

(57) ABSTRACT

A technique is provided for controlling an object avatar. The technique includes receiving one or more utterance from one or more user. Further, one or more object avatar is determined from object avatar database based on context. Based on one or more utterances, one or more parameters is extracted to control the object avatar. Further, one or more outcome is determine based on the one or more parameters extracted. Subsequently, the object avatar is controlled when the one or more outcomes correspond to a one or more permissible outcomes.

20 Claims, 6 Drawing Sheets

Method 400 for controlling object avatar

(56) References Cited

U.S. PATENT DOCUMENTS

| | | | |
|---|---|---|---|
| 2006/0294465 A1* | 12/2006 | Ronen | H04M 1/72544 |
| | | | 715/706 |
| 2008/0195944 A1 | 8/2008 | Lee et al. | |
| 2009/0150158 A1* | 6/2009 | Becker | G06F 16/58 |
| | | | 704/270 |
| 2010/0241999 A1* | 9/2010 | Russ | G06F 3/04815 |
| | | | 715/863 |
| 2011/0026835 A1* | 2/2011 | Ptucha | G06F 16/583 |
| | | | 382/209 |
| 2012/0256926 A1* | 10/2012 | Jimenez | G06T 11/206 |
| | | | 345/440 |
| 2014/0143733 A1* | 5/2014 | Jung | H04N 13/398 |
| | | | 715/848 |
| 2015/0170646 A1 | 6/2015 | Fujii et al. | |
| 2017/0039750 A1* | 2/2017 | Tong | G06T 7/20 |
| 2017/0068423 A1* | 3/2017 | Napolitano | G06F 3/0482 |
| 2018/0068656 A1 | 3/2018 | Lehman et al. | |
| 2018/0157397 A1* | 6/2018 | Freeman | G06F 3/167 |
| 2018/0336543 A1* | 11/2018 | Van Os | G06Q 20/223 |
| 2020/0211247 A1* | 7/2020 | Ramachandra Iyer | |
| | | | G10L 15/22 |

\* cited by examiner

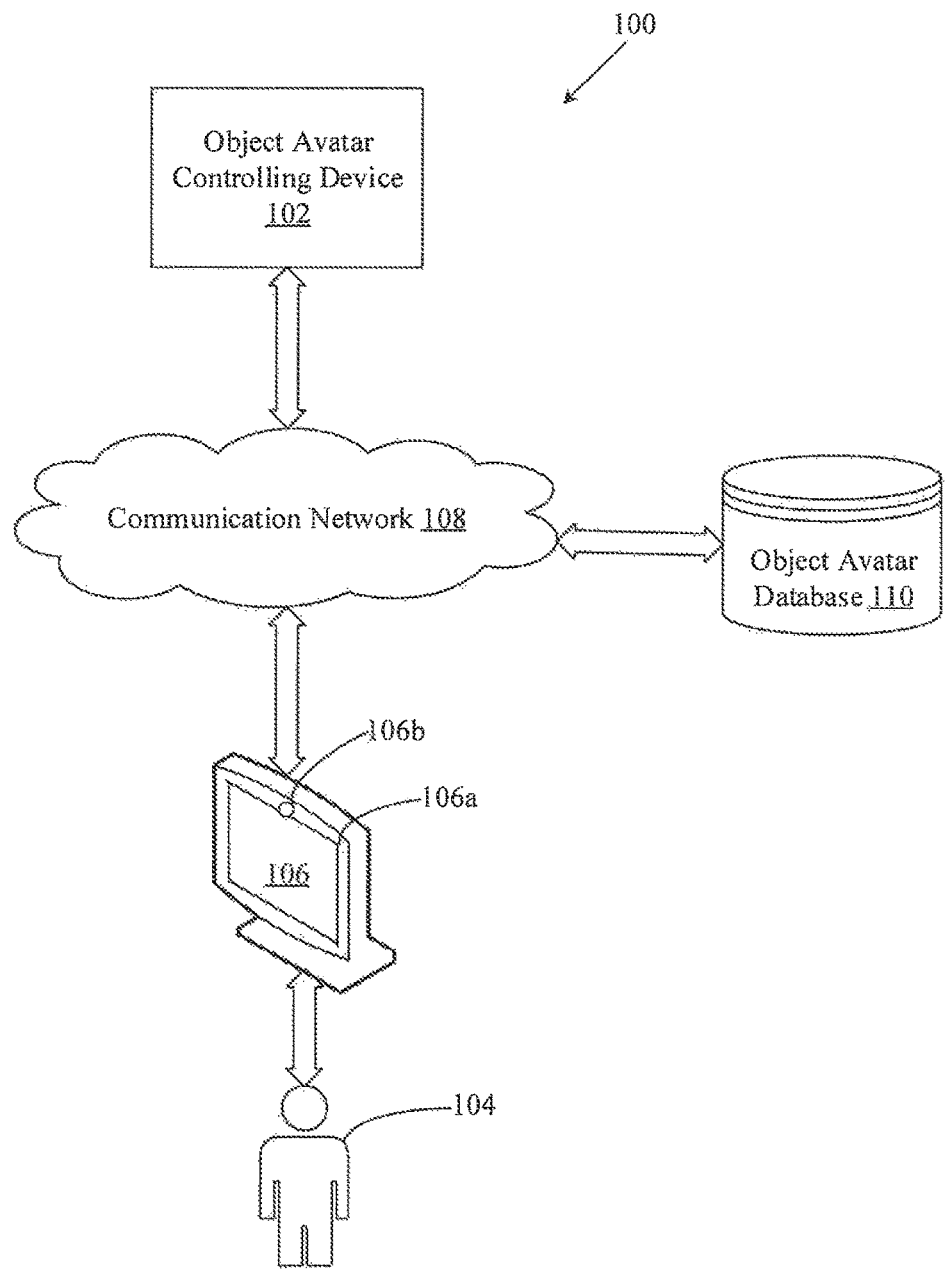
FIG. 1 System Environment 100 for controlling an object avatar

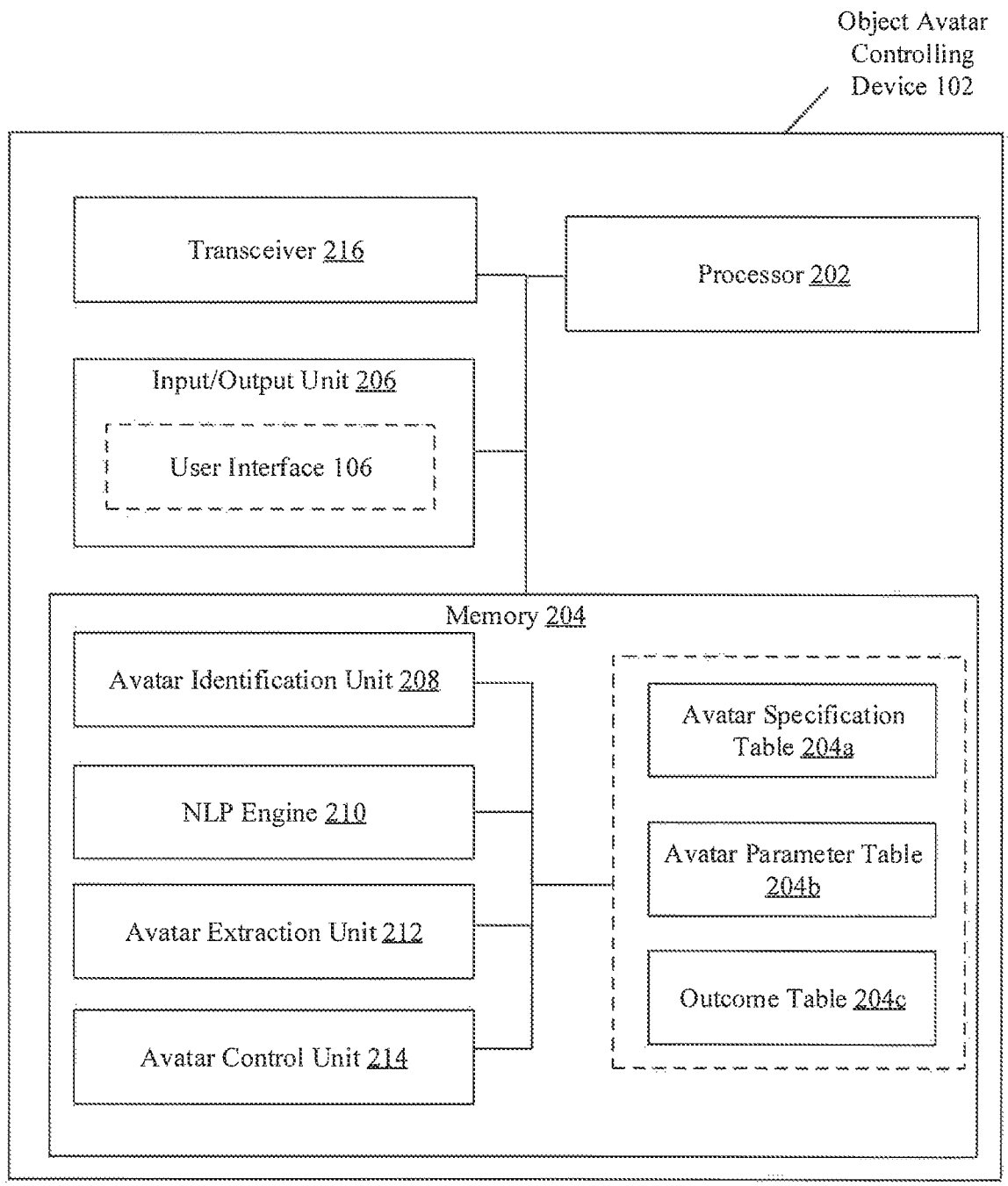
FIG. 2: Object Avatar Controlling Device 102

| Object Type 302 | Specification 304 | Parameter 306 | Outcome 308 |
|---|---|---|---|
| Fan | blades | Motion(rpm) | If rpm>24, background objects visible<br><br>If rpm>400 it wobbles and breaks<br><br>If rpm>350 it makes sound as in noise1.mpg file |
|  |  | Length |  |
|  |  | color |  |
|  | Rotor | .. | If bearing is 5 years old, it makes noise as in sound |
|  | .. |  |  |
FIG. 3: Table 300 for storing data in object avatar database 110

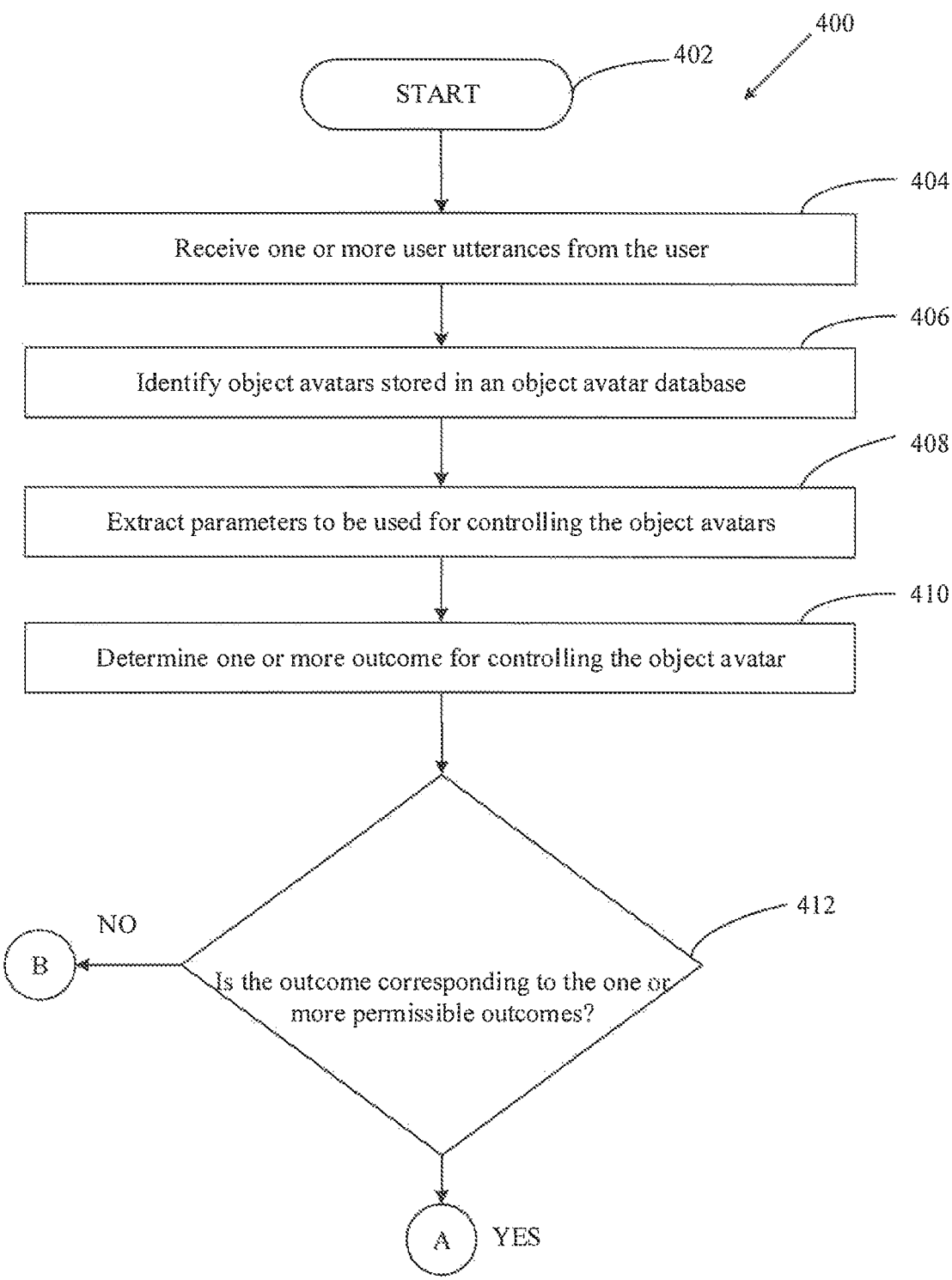
FIG. 4A: Method 400 for controlling object avatar

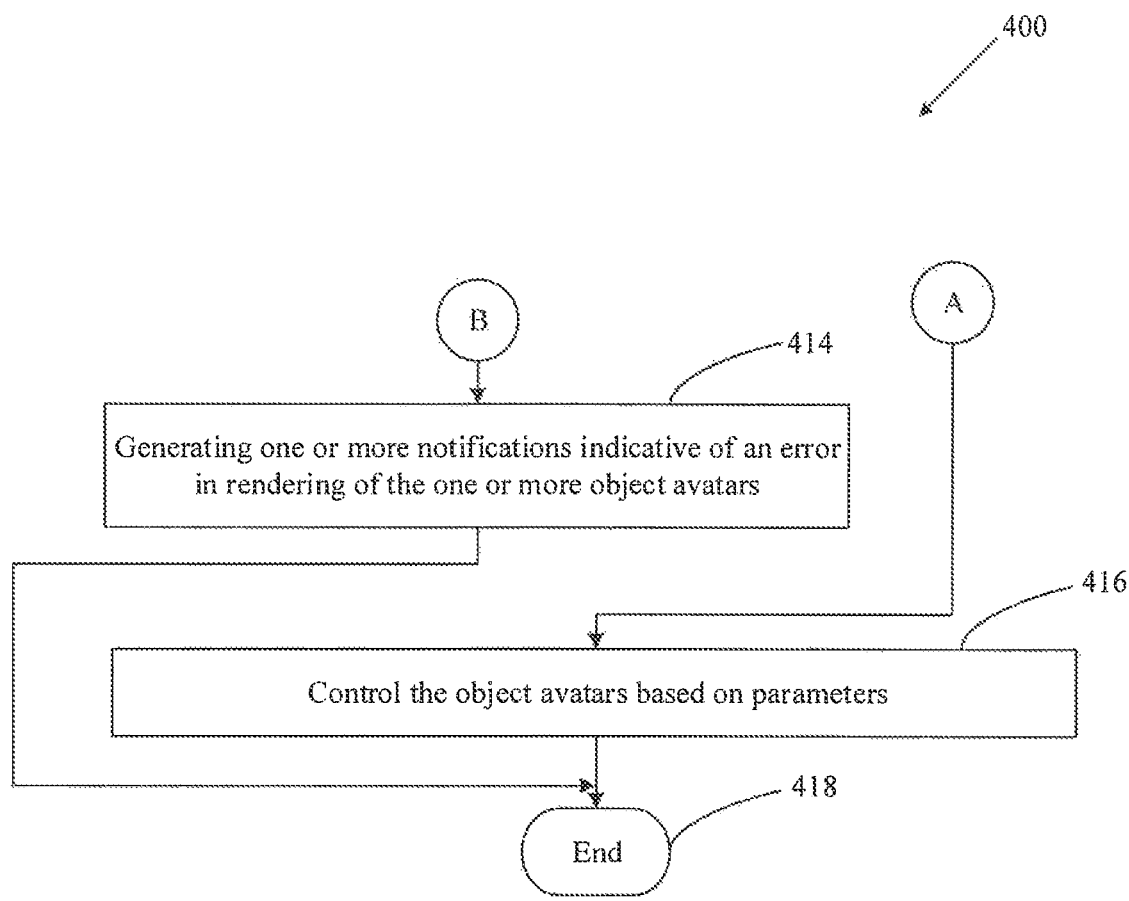
FIG. 4B: Method 400 for controlling object avatar

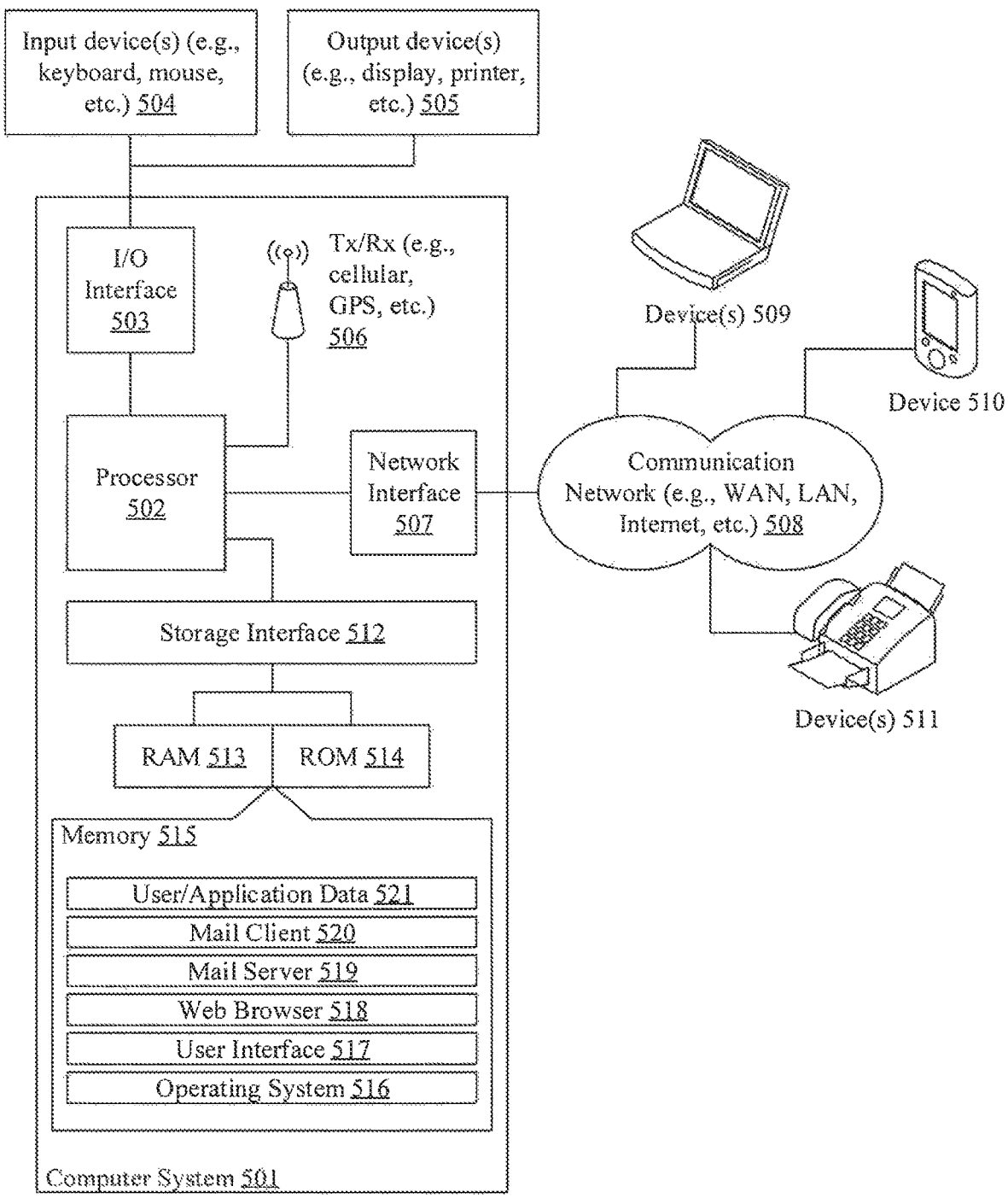
FIG. 5: Example Computer System

METHOD AND SYSTEM FOR CONTROLLING AN OBJECT AVATAR

TECHNICAL FIELD

This disclosure relates generally to object avatars, and more particularly to system and method for contextual control of object avatar.

BACKGROUND

Advancements in the field of virtual machines have led to development of various avatars. An avatar is a graphical illustration that represents a computer user, a version of a user or an object in a virtual space. An avatar can be used for various purposes, such as gaming, marketing demonstrations, and introducing scientific concepts. An important aspect of rendering avatar is to select right choice of avatar based on expression of the user and to respond to their queries. In order to effectively accomplish the aforementioned purposes, it is imperative to have avatars that are interactive so as to provide a more immersive user experience.

It is therefore desirable to provide a mechanism to generate and render context driven avatar. It may be further desired to enable a user to customize the rendering of avatar in real-time, based on a fast changing requirements.

SUMMARY

In one embodiment, a method of controlling an object avatar is disclosed. In one example, the method comprises receiving one or more utterances from one or more users. The method further comprises identifying one or more object avatars stored in an object avatar database. The identification is based on at least a context associated with the one or more utterances. The object avatar database comprises one or more permissible outcomes corresponding to a set of parameters for controlling the one or more object avatars. The method further comprises extracting one or more parameters to be used for controlling the one or more object avatars, from the one or more user utterances. The method further comprises determining based on a vector classification of the one or more parameters and the set of parameters, one or more outcomes of controlling the one or more object avatars based on the one or more parameters. The method further comprises controlling the one or more object avatars based on the one or more parameters, when the one or more outcomes correspond to the one or more permissible outcomes.

In another embodiment, a system is disclosed for controlling a device avatar is disclosed. The system comprises a processor and a memory communicatively coupled to the processor. The memory stores processor-executable instructions, which, on execution, cause the processor to receive one or more utterances from one or more users. The processor-executable instructions, on execution, further cause the processor identify one or more object avatars stored in an object avatar database, based on at least a context associated with the one or more utterances. The object avatar database comprises one or more permissible outcomes corresponding to a set of parameters for controlling the one or more object avatars. The processor-executable instructions, on execution, further cause the processor to extract one or more parameters to be used for controlling the one or more object avatars, from the one or more user utterances. The processor-executable instructions, on execution, further cause the processor to determine, based on a vector classification of the one or more parameters and the set of parameters, one or more outcomes of controlling the one or more object avatars based on the one or more parameters. The processor-executable instructions, on execution, further cause the processor to control the one or more object avatars based on the one or more parameters, when the one or more outcomes correspond to the one or more permissible outcomes.

In yet another embodiment, a non-transitory computer-readable medium storing computer-executable instructions for a for controlling a device avatar is disclosed. In one example, the stored instructions, when executed by a processor, cause the processor to receive one or more utterances from one or more users. The processor-executable instructions, on execution, further cause the processor identify one or more object avatars stored in an object avatar database, based on at least a context associated with the one or more utterances. The object avatar database comprises one or more permissible outcomes corresponding to a set of parameters for controlling the one or more object avatars. The operations further comprise extracting one or more parameters to be used for controlling the one or more object avatars, from the one or more user utterances. The operations further comprise determining, based on a vector classification of the one or more parameters and the set of parameters, one or more outcomes of controlling the one or more object avatars based on the one or more parameters. The operation further comprise controlling the one or more object avatars based on the one or more parameters, when the one or more outcomes correspond to the one or more permissible outcomes.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIG. 1 is a block diagram of an exemplary network environment for controlling an object avatar, in accordance with some embodiments of the present disclosure.

FIG. 2 is a block diagram of exemplary system for controlling an object avatar, in accordance with some embodiments of the present disclosure.

FIG. 3 illustrates an exemplary table for storing data in an object avatar database.

FIGS. 4A and 4B collectively illustrate a flow diagram of a detailed exemplary process for controlling an object avatar, in accordance with some embodiments of the present disclosure FIG. 5 is a block diagram of an exemplary computer system for implementing embodiments consistent with the present disclosure.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Referring now to FIG. 1, an exemplary network environment 100 for controlling an object avatar is illustrated, in accordance with some embodiments of the present disclosure. As will be described in greater detail in conjunction with FIG. 2, the network environment 100 displays an object avatar based on user utterance. The system may further identify one or more object avatars and extract one or more parameters to be used for controlling the one or more object avatars. The system further determines one or more outcomes of controlling the one or more object avatars based on the one or more parameters. The system then controls the object avatar based on the one or more utterance and permissible outcomes.

The network environment 100 includes a network of object avatar controlling device (e.g., a computer, a server, a digital device, a router, a modem, a bridge, a switch, etc.) for sending or receiving various data. In one embodiment, the network environment 100 includes an object avatar controlling device 102 associated with a user 104, and a one or more remote network entities, such as the object avatar database 110. The object avatar controlling device 102 and the object avatar database 110 may be in communicatively coupled with each other via a communication network 108. Each of the computing devices further includes one or more processors and a computer-readable medium (e.g., a memory). The computer-readable storage medium stores instructions that, when executed by the one or more processors, cause the one or more processors to perform data reception and transmission in accordance with aspects of the present disclosure. The computer-readable storage medium may also store various data (e.g., avatar specification, avatar parameters, outcomes etc.) that may be captured, processed, and/or required by the network environment 100.

The object avatar controlling device 102 may include suitable logic, circuitry, interfaces, and/or code for controlling one or more object avatars, based on one or more user utterances. The one or more user utterances may have a permissible outcomes and also impermissible outcomes. In an implementation, the object avatar controlling device 102 may further include a Natural Language Processing (NLP) Engine for receiving the one or more utterances of the user 104 and subsequently extracting one or more parameters from the one or more utterances. In an implementation, the Natural Language Processing Engine (NLP) (not shown) may be integrated internally into the object avatar controlling device 102. In another implementation, the NLP Engine may be external to the object avatar controlling device 102 and may be communicatively coupled via the communication network 108.

Examples the user interface 106 may include suitable logic, circuitry, interfaces, and/or code for displaying/controlling one or more object avatar to the user 104 on a display device 106a. The implementation of the display device 106a of the object avatar controlling device 102 may include, but are not limited to, a Liquid Crystal Display (LCD) display, a Light Emitting Diode (LED) display, an Organic LED (OLED) display technology. The object avatar controlling device 102 may further include an image capturing device 106b for recording multimedia provided by an administrative user. The object avatar may be controlled on the display device 106a. A user 104 may capture a real time object and may control the object avatar for the captured image.

The communication network 108 may include a medium through which the object avatar controlling device 102 and object avatar database 110 present in the network environment 100 may communicate with each other. Examples of the communication network 108 may include, but are not limited to, the Internet, a cloud network, a Wireless Fidelity (Wi-Fi) network, a Wireless Local Area Network (WLAN), a Local Area Network (LAN), a telephone line (POTS), Long Term Evolution (LTE), and/or a Metropolitan Area Network (MAN). Various devices in the exemplary network environment 100 may be configured to connect to the communication network 108, in accordance with various wired and wireless communication protocols. Examples of such wired and wireless communication protocols may include, but are not limited to, Transmission Control Protocol and Internet Protocol (TCP/IP), User Datagram Protocol (UDP), Hypertext Transfer Protocol (HTTP), File Transfer Protocol (FTP), Zigbee, EDGE, infrared (IR), IEEE 802.11, 802.16, cellular communication protocols, and/or Bluetooth (BT) communication protocols.

The object avatar database 110 may include suitable logic, circuitry, interfaces, and/or code for storing data and modules. The object avatar database 110, may include one or more permissible outcomes corresponding to a set of parameters for controlling the one or more object avatars in an implementation, the object avatar database 110 may include, but is not limited to, the data of object avatar specification and object avatar parameters. The object avatar database 110 may also store one or more relationships among a plurality of object avatars. Moreover, the object avatar database may also get auto updated periodically and/or based on one or more inputs provided by an administrative user.

In operation, the object avatar controlling device 102 may receive one or more utterances from one or more users. The one or more utterances may include conversation between a plurality of users, wherein the aforementioned one or more utterances may correspond to the utterance of a user (such as the user 104) based on whose utterance, one or more object avatars may be controlled. A person of ordinary skill in the art will appreciate that in another alternate embodiment, the object avatar controlling device 102 may receive the one or more utterances from the user other than the user 104, or all the users that may be part of the conversation.

The object avatar controlling device 102 may further perform identification of one or more object avatars stored in an object avatar database 112. The identification may be based on at least a context associated with the one or more utterances. For example, when the one or more utterances of the user 104 is "morning light failed to turn on", the object avatar controlling device 102 may identify that the context of the one or more user utterances refers to a "wakeup lamp". Consequently, based on identification of the appropriate context, the object avatar controlling device 102 may identify the one or more object avatars referred to in the conversation as "a wakeup lamp". Subsequently, the object avatar controlling device 102 may retrieve multimedia corresponding to the "wakeup lamp" from the object avatar database 110 and renders it on the display device 106a.

Upon identification of the one or more object avatars, the object avatar controlling device 102 may extract one or more parameters to be used for controlling the one or more object avatars, from the one or more user utterances. The one or more parameters include the actions to be performed on the object avatar. In an embodiment, the parameter may correspond to increasing the intensity of wakeup lamp, or increasing or decreasing the speed of a fan depicted via a corresponding object avatar on the display device 106a. Based on the data stored in the object avatar database 110 the fan speed may be increased.

The object avatar controlling device 102 may further determine one or more outcomes of controlling the one or more object avatars based on the one or more parameters extracted from the one or more user utterances. The determination may be based on vector classification of the one or more parameters extracted and the set of parameters stored in the object avatar database 110. Further, a user 104 may provide one or more new parameters, which may render one or more permissible outcomes. The one or more permissible outcomes are updated with one or more additionally permissible outcomes based on a set of new parameters provided by the administrative user.

The determined one or more outcomes may be in accordance with the one or more permissible outcomes (as stored in the object avatar database 110). The object avatar controlling device 102 may control the one or more object avatar based on determination of one or more outcomes. The control of object avatar is performed on display device 106a. In an example, the user may utter "Increase the speed of fan to 50 rotations per minute (rpm)." The object avatar (Fan) is displayed on the display device 106a running at the speed of 50 rpm which is already stored in object avatar database 110.

Conversely, when the one or more outcome determined is not in accordance with the one or more permissible outcomes, the object avatar controlling device 102 may generate one or more notifications indicative of an error in rendering of the one or more object avatars for the one or more users. The notifications may be rendered on the user interface 106. For example, when the maximum permissible speed of operating a fan is 75 rpm, and the user 104 utters "Increase the speed of fan to 100 rpm", the object avatar controlling device 102 may notify (via the user interface 106 a statement that "This outcome could not be performed."

The object avatar rendered on the display device 106a may transition from a 2-dimensional (2D) user interface 106 to a 3-dimensional (3D) UI 206 based on one or more pre-defined gestures performed by the one or more users on the respective UI. In an embodiment, when the user 104 utters "The fan looks like this in 3D." The object avatar of the fan may be transitioned from a 2-dimensional user interface to a 3-dimensional user interface. The user 104 may control object avatar in 3D interface also.

In an embodiment, an administrative user having the required permissions for controlling the network environment 100, may provide one or more object avatars based on multimedia. In an embodiment, the multimedia may include, but is not limited to, one or more images of an object captured by the image capturing device 106b Based on the received one or more images, the object avatar controlling device 102 may generate one or more object avatars that can be used for the ongoing conversation of the user 104. Further, the generated one or more object avatars may be stored in the object avatar database 110. In an embodiment, the object avatar database 110 may further store the metadata of the one or more object avatars provided by the administrative user. The metadata may be augmented with additional information about the one or more object avatars that may be obtained from the user from a centralized product repository, user manuals internet, and the like. The administrative user may correspond to the user 104 in the above embodiment.

It should be noted that the various modules described above may be implemented in programmable hardware devices such as programmable gate arrays, programmable array logic, programmable logic devices, and so forth. Alternatively, the various modules described above may be implemented in software for execution by various types of processors. An identified module of executable code may, for instance, include one or more physical or logical blocks of computer instructions which may, for instance, be organized as an object, procedure, function, engine, or other construct. Nevertheless, the executables of an identified module need not be physically located together, but may include disparate instructions stored in different locations which, when joined logically together, include the module and achieve the stated purpose of the module. Indeed, a module of executable code could be a single instruction, or many instructions, and may even be distributed over several different code segments, among different applications, and across several memory devices.

As will be appreciated by one skilled in the art, a variety of processes may be employed for transmitting data over a communication network 108. For example, the exemplary network environment 100 may transmit data over a communication network 108 by the processes discussed herein. In particular, as will be appreciated by those of ordinary skill in the art, control logic and/or automated routines for performing the techniques and steps described herein may be implemented by the network environment 100, either by hardware, software, or combinations of hardware and software. For example, suitable code may be accessed and executed by the one or more processors on the network environment 100 to perform some or all of the techniques described herein. Similarly, application specific integrated circuits (ASICs) configured to perform some or all of the processes described herein may be included in the one or more processors on the network environment 100.

FIG. 2 is a block diagram of exemplary system for controlling an object avatar on an object avatar controlling device 102, in accordance with some embodiments of the present disclosure. FIG. 2 is explained in conjunction with elements from FIG. 1. With reference to FIG. 2, there is shown the object avatar controlling device 102. The object avatar controlling device 102 may include one or more processors, such as a processor 202. The object avatar controlling device 102 may further include a memory 204, an input/output (I/O) unit 206, and a transceiver 216. The processor 202 may be communicatively coupled to the memory 204, the I/O unit 206, and the transceiver 216. In an embodiment, the object avatar controlling device 102 may be communicatively coupled to the one or more remote network entities, such as the object avatar database 110 through the communication network 108, via the transceiver 216.

The processor 202 may include suitable logic, circuitry, interfaces, and/or code that may be configured to execute a set of instructions stored in the memory 204. The processor 202 may be configured to receive the one or more utterances of the user 104. The processor 202 may control the object avatar via user interface 106 on the display device 106a of the object avatar controlling device 102 by extraction of one or more parameters and determination of one or more outcomes, which may be stored in the memory 204 of the object avatar controlling device 102. Examples of the processor 202 may be an X86-based processor, a Reduced Instruction Set Computing (RISC) processor, an Application-Specific Integrated Circuit (ASIC) processor, a Complex Instruction Set Computing (CISC) processor, and/or other processors.

The memory 204 may include suitable logic, circuitry, and/or interfaces that may be configured to store a machine code and/or a computer program with at least one code section executable by the processor 202. In an embodiment, the memory 204 may be configured to store the functional modules (i.e. determination, extraction and control module of the object avatar) and the data related to the object avatar. The stored data may include, but is not limited to, one or more relationship tables, such as an avatar specification table 204a, an avatar parameter table 204b, and an outcome table 204c. The memory may be further configured to store one or more modules that include, but are not limited to, an avatar identification unit 208, a Natural Language Processing (NLP) engine 210, an avatar extraction unit 212, and, an avatar control unit 214. In an implementation, Examples of implementation of the memory 204 may include, but are not limited to, Random Access Memory (RAM), Read Only Memory (ROM), Hard Disk Drive (HDD), and/or a Secure Digital (SD) card.

The I/O unit 206 may include suitable logic, circuitry, interfaces, and/or code that may be configured to receive one or more user utterances of the user 104 via the user interface 106, and provide an outcome to the user on the display device 106a. The I/O unit 206 may include various input and output devices that may be configured to communicate with the processor 202. The object avatar controlling device 102 may display one or more interfaces to the user 104 on the display device 106a. Examples of the display device 106a have been disclosed in FIG. 1. The object avatar controlling device 102 may further receive one or more utterances of the user 104 via the user interface 106 either as audio inputs, video inputs, and/or textual inputs. Further, the user interface 106 of the I/O unit 206 may be equipped with an image capturing device 106b for recording multimedia provided by the user 104 and updating the avatar object database 110 with multimedia inputs. Examples of implementation of the user interface 106 may include, but are not limited to, a digital camera, a camera embedded in a personal digital assistant (PDA), a video camera, and/or a motion camera, speech recorder etc. A person of ordinary skill in the art will appreciate that the I/O unit may further include one or more audio based output devices for enabling communication with the user 104.

The transceiver 216 may include suitable logic, circuitry, interfaces, and/or code that may be configured to communicate with various network entities present in the network environment, via a communication network 108. The transceiver 216 may implement known technologies to support wired or wireless communication. The transceiver 216 may include, but is not limited to, an antenna, a radio frequency (RE) transceiver, one or more amplifiers, a tuner, one or more oscillators, a digital signal processor, a coder-decoder (CODEC) chipset, a subscriber identity module (SIM) card, and/or a local buffer. The transceiver 216 may communicate via wireless communication with networks, such as the Internet, an Intranet and/or a wireless network, such as a cellular telephone network, a wireless local area network (LAN) and/or a metropolitan area network (MAN). The wireless communication may use any of a plurality of communication standards, protocols and technologies, such as Global System for Mobile Communications (GSM), Enhanced Data GSM Environment (EDGE), wideband code division multiple access (W-CDMA), code division multiple access (CDMA), Long Term Evolution (LTE), time division multiple access (TDMA), Bluetooth, Wireless Fidelity (Wi-Fi) (such as IEEE 802.11a, IEEE 802.11b, IEEE 802.11g and/or IEEE 802.11n), voice over Internet Protocol (VoIP), Wi-MAX, a protocol for email, instant messaging, and/or Short Message Service (SMS).

In operation, the processor 202 in conjunction with the I/O unit 206 may be configured to receive one or more utterances from one or more users, such as the user 104, via a user interface 106. The one or more utterances may include conversation between a plurality of users. The aforementioned one or more utterances may correspond to the utterance of a user (such as the user 104) based on whose utterance, one or more object avatars may be controlled. A person of ordinary skill in the art will appreciate that in another alternate embodiment, the object avatar controlling device 102 may receive the one or more utterances from the user other than the user 104, or all the users that may be part of the conversation.

In an embodiment, when the user 104 may be in conversation with another user, the processor 202 in conjunction with the NLP Engine 210 and I/O unit 206, may recognize the one or more utterances of the user 104 and display an object avatar based on the context of the one or more utterances on the display device 106a. In an exemplary scenario, the user 104 may be a marketing executive who may be attempting provide a demo of a product to a customer. During the demonstration, the user interface 206 may recognize the speech of the marketing executive and identify an object avatar corresponding to the product from the object avatar database 110. The processor 202 may be configured to render the identified on the user interface 106. In another exemplary scenario, the identification of the object avatar from the object avatar database 110 may be based on one or more utterances received from the customer that may be interacting with the user 104.

In another embodiment, the user 104 may choose object avatar from a stored multimedia. The user 104 may provide one or more object avatars based on multimedia. In an embodiment, the multimedia may include, but is not limited to, one or more images of product by image capturing device 106b. As an example, the user 104 may capture a picture of photograph of a table fan and may control the object avatar of the table fan on the display device 106a.

Based on the received one or more images, the processor 202 may be configured to generate one or more object avatars that can be used for the ongoing demonstration of the product by the user 104. Further, the processor 202 may store the generated one or more object avatars in the object avatar database 110. In an embodiment, the processor 202 may be further configured to receive metadata of the one or more object avatars provided by the user 104. The metadata may be augmented with additional information about the one or more object avatars that may be obtained from the user 104 from a centralized product repository, user manuals Internet, and the like. A person of ordinary skill in the art will appreciate that the user 104 may correspond to an administrative user having required permissions for controlling the network environment 100. As an example, the user 104 may use a ceiling fan as an object avatar by capturing image on such fan by the image capturing device 106b. The data related to a ceiling fan may already be saved in the object avatar database 110. The metadata of a similar object (such as a table fan) may be attached with the captured image (of the ceiling fan) either in parts or in total. Consequently, if the user 104 captures the image of a ceiling fan and wants to have it as the avatar for subsequent conversation (i.e., to describe the problem faced with it) and the system has a table fan avatar in the object avatar database 110, the common metadata or the parameters such as impact of permissible rate of revolution can be reused. Alternately, the additional information about the captured image may be obtained from the user 104, from the database of the vendor, from the centralized product database, authentic documents from Internet and the like. Other information such as color of blades, length, and the like may be populated by the image processing (parts detection) techniques.

In an embodiment, the identification of the processor 202 object avatar may be based on at least a context associated with the one or more utterances over the I/O unit 206. The processor 202, in conjunction with avatar identification unit 208, may be configured to identify the object avatar based on at least a context associated with the received one or more user utterances. Such an identification of object avatar may be performed dynamically during a user conversation. The context of the one or more utterances may be identified by parsing performed by the processor 202 in conjunction with the NLP engine 210, on the one or more utterances. The parsing may include, but is not limited to, extracting nouns from the one or more user utterances and associating the nouns to the object avatars stored in the object avatar database 110.

In an embodiment, the processor 202 may provide the parsed output of the one or more utterances from the NLP engine 210, to the avatar extraction unit 212. The avatar extraction unit 212 may be configured to extract the parameters (i.e. action words) in the one or more utterances of the user 104 and map parameters with the object avatar stored in the object avatar database 110. To this end, the avatar extraction unit 212 may be configured to refer to the avatar specification table 204a and avatar parameter table 204b stored in the memory 204, in order to map the extracted parameters needed to identify and control the object avatar based on the one or more utterances of the user 104. A person of ordinary skill in the art will appreciate that not all parameters uttered by the user 104 are required to control the object avatar.

In an exemplary scenario, during the conversation, the user reference to any object or a part of the object can be direct or implied. For example, when the one or more utterances of the user 104 is "morning light failed to turn on", the processor 202 in conjunction with avatar identification unit 208, may identify that the context of the one or more user utterances refers to a "wakeup lamp" by comprehending the implicit meaning and context of the utterance. Consequently, based on identification of the appropriate context, the object avatar controlling device 102 may identify the one or more object avatars referred to in the conversation as "a wakeup lamp". Subsequently, the processor 202, in conjunction with avatar may retrieve multimedia corresponding to the "wakeup lamp" from the object avatar database 110 and renders it on the display device 106a.

In another embodiment, during the conversation, the one or more utterances of the user 104 is "Turn on the ceiling fan", the processor 202 in conjunction with avatar identification unit 208, may identify the object avatar as ceiling fan which is explicitly referred by the user 104. Subsequently, the processor 202, in conjunction with avatar may retrieve multimedia corresponding to the "ceiling fan" from the object avatar database 110 and renders it on the display device 106a.

Once the one or more object avatar is identified from a plurality of object avatars stored in the object avatar database 110, the processor 202 in conjunction with the avatar extraction unit 212, extract the one or more parameters required to control the one or more object avatars As an example, when the one or more utterances of the user 104 mentions that "the fan rotor makes a lot of sound.", the processor 202, in conjunction with the NLP engine 210, based on the parsing, may identify the context of the conversation as one that relates to "fan" and "sound" associated with the fan. Consequently, the processor 202 in conjunction with the avatar identification unit 208 may identify the one or more object as "fan" and may retrieve a corresponding avatar from the object avatar database 110 along with an associated set of parameters for controlling the avatar, via the transceiver 216. Subsequently, processor 202 in conjunction with the I/O unit 206, may render an object avatar of the fan on the display device 106a. In an exemplary scenario, when the object may be a composition of a plurality of smaller objects, such that each of the smaller object has a corresponding object avatar. The smaller objects may derive all the features from the parent object. As an example, when the context of the one or more utterance of the user 104 is a restaurant, a restaurant can be an object avatar, and a table in the restaurant may be a different object avatar. Depending on what the user 104 is referring to, the table or the restaurant will be the displayed object avatar on display device 106a. The table in the above example derives features such as "Mexican food" derived from the restaurant (a Mexican restaurant). A person of ordinary skill in the art will appreciate that there can be more than one avatar active on the display device 106a at a time. Any reference (i.e. change of parameters) to one object avatar may bring in visible change in the other object avatar due to interlinking of the parameters especially if they are derived from same parent object avatar (restaurant is this particular example). The interaction of many object avatars can happen in parallel providing a good overview.

The processor 202 in conjunction with the avatar extraction unit 212, may extract one or more parameters to be used for controlling the one or more object avatars from the one or more utterances. The extracted one or more parameters for controlling the action on fan may be displayed on the display device 106a.

The processor 202 may be further configured to classify the one or more parameters and the set of parameters by means of one or more vector classification techniques. Here the one or more parameters refer to the parameter extracted by the avatar extraction unit 212 and the set of parameters refer to the parameters stored in the object avatar database 110. In an embodiment, the vector classification may be based on a historical data for resolving anaphora and for relating the sentences to parts or parameters of the object. The noun and verb (up on which action is to be performed) are blended over the applied parts of the one or more utterances data from the parsed utterances of the user. For example, if the user 104 utters "the blade is not running fast. Make it 400 rpm", here the first sentence uttered by the user 104 involves nothing except providing the data that the user is uttering to describe a fan, and the second sentence "make it 400" makes the speed specification of the fan as 400 rpm. Accordingly, the processor 202 may control an object avatar being rendered corresponding to the blade rotate at a speed of 400 rpm. After the control has been performed on display device 106a, for every new parameter extracted by the object avatar controlling device 102, new permissible outcomes may be stored in the database 110 for further reference.

However, the controlling discussed above is a function of determination of one or more outcomes of controlling the one or more object avatars based on the one or more parameters. In an embodiment, the one or more outcomes may correspond to one or more permissible outcomes and one or more impermissible outcomes that may be stored in the object avatar database 110 along with each respective object avatar, in the avatar specification table 204a and avatar parameter table 204b. When the determined one or more outcomes correspond to permissible outcome, the processor 202 in conjunction with the avatar control unit 214, may perform controlling of the rendered object avatar on the display device 106a. When the one or more utterances of the user 104 do not correspond to a permissible outcome, the processor 202 may be configured to generate one or more notifications on the display device 106a indicative of an error in rendering of the one or more object avatars for the one or more users.

As an example, when the one or more utterance of the user 104 includes, "go to full bright in 10 seconds", the avatar identification unit 208 based on context identifies that the object avatar to be displayed on display device 106a is a lamp. Further, the avatar extraction unit 212 via NLP engine 210 extracts that the lamp should gradually do this so that it attains full bright in 10 seconds. Here, the one or more parameters correspond to "10 seconds" and/or "full brightness" and the set of parameters retrieved from the object avatar database 110 may correspond to "5 seconds". Accordingly, the processor 202 in conjunction with the avatar control unit, may control the rendered object avatar of the lamp in such a way that it becomes fully bright in "10 seconds". However, had the set of parameters been "20 seconds", which is to say that the lamp by configuration would take 20 seconds to attain full brightness, the processor 202 may generate a notification to indicative of an error in rendering of the one or more object avatars, via the I/O unit 206.

Similarly, in another exemplary scenario, the user 104 may ask the white colored table lamp to go red or may ask the fan to turn reverse. For each of the parameters extracted by an avatar extraction unit 212, the anticipated outcome is populated on a real object. If the outcome corresponds to be permissible on a real object, the object avatar is controlled by the user 104. If the one or more outcome does not correspond to be permissible on a real object, the display device 106a generates one or more notifications indicative of an error in rendering of the one or more object avatars for the user 104. In both the embodiments, the outcome may not correspond to one or more permissible outcome. Hence, the display device 106a generates one or more notifications indicative of an error in rendering of the one or more object avatars for the user 104.

Further, the vector classification infers the consequence of the one or more outcomes on a real object. In an embodiment, the user 104 may ask a white colored table lamp to go red or may ask the fan to turn reverse. For each of the parameters extracted by an avatar extraction unit 212, the anticipated outcome is populated on a real object. If the outcome corresponds to be permissible on a real object, the object avatar is controlled by the user 104. If the one or more outcome does not correspond to be permissible on a real object, the display device 106a generates one or more notifications indicative of an error in rendering of the one or more object avatars for the user 104. In both the embodiments, the outcome may not correspond to one or more permissible outcome. Hence, the display device 106a generates one or more notifications indicative of an error in rendering of the one or more object avatars for the user 104.

The object avatar database 110 may include one or more permissible outcomes corresponding to a set of parameters for controlling the one or more object avatars. In an implementation, the object avatar database 110 may include, but is not limited to, the data of object avatar specification and object avatar parameters. The object avatar database 110 may also store one or more relationships among a plurality of object avatars. Moreover, the object avatar database may also get auto updated periodically and/or based on one or more inputs provided by an administrative user.

The object avatar database 110 may also include natural relationships among a plurality of object avatars. Further, the outcomes provide additional information or constraints on the stored object avatar parameters. Further, object avatar database 110 is populated from the domain experts, end users or from the information available from public domain. Further, the object avatar database 110 can be auto updated with more outcomes performed by the user 104.

FIG. 3 illustrates an exemplary table 300 of storing data in the object avatar database 110. The table may correspond to a combination of the avatar specification table 204a and the avatar parameter table 204b, discussed in FIG. 2. The table may include details corresponding to an object type in column 302, specification of an object in column 304, parameters corresponding to an object in column 306, and outcomes for operation of an object in column 308. As an example, for an object of type "fan", the specific components may be "blades" and "rotor". Further, based on operation of fan at specific speeds, the background of the corresponding object avatar for the object "fan" may be rendered visible, or a sound may be generated, or the object may suspend its operation.

As explained in detail in FIG. 2, the aforementioned table (a combination of the avatar specification table 204a and the avatar parameter table 204b) may be referred to by the avatar control unit 214, upon determination of the one or more outcomes. It is based upon this table that the processor 202 controls the rendered object avatar, or generates error notifications when the determined one or more outcomes do not correspond to the one or more permissible outcomes.

FIGS. 4A and 4B collectively represent a flow diagram of a detailed exemplary process for controlling an object avatar on an object avatar controlling device 102, in accordance with some embodiments of the present disclosure. With reference to FIGS. 4A and 4B, there is shown a flow chart 400. The flow chart 400 is described in conjunction with FIGS. 1 to 3. The process starts at step 402 and proceeds to step 404.

At step 404, the processor 202 in conjunction with the I/O unit 206 may be configured to receive one or more utterances from one or more users, such as the user 104 over the interface 106. The one or more utterances may include conversation between a plurality of users, wherein the aforementioned one or more utterances may correspond to the utterance of a user (such as the user 104) based on whose utterance, one or more object avatars may be controlled. In an embodiment, the user may capture a real time object by the image capturing device 106b and use it as an object avatar. At step 406, subsequent to the receiving of one or more utterances by the user 104, the processor 202 may be configured to identify one or more object avatars stored in an object avatar database 110, based on at least a context associated with the one or more utterances over the I/O unit 206. Such an identification may be performed dynamically during a user conversation.

At step 408, once one or more object avatar is detected, the processor 202 in conjunction with the avatar extraction unit 212, extract one or more parameters to be used for controlling the one or more object avatars, from the one or more user utterances. At step 410, based on the extracted parameters needed to control the object avatar, the processor 202 may be configured to determine one or more outcomes of controlling the one or more object avatars based on a vector classification of the one or more parameters and a set of parameters associated with the identified one or more object avatars. Here the one or more parameters refer to the parameter extracted by the avatar extraction unit 212 and the set of parameters refer to the parameters stored in the object avatar database 110. This step brings out the indicated action on the object avatar.

At step 412, the processor 202 determines whether the outcome corresponds to the one or more permissible outcomes stored in object avatar database 110. If the outcome corresponds to the one or more permissible outcomes stored in object avatar database 110, the control passes to step 416. If the outcome does not corresponds to the one or more permissible outcomes stored in object avatar database 110, the control passes to the step 414.

At step 414, the processor 202 in conjunction with the I/O unit may generate one or more notifications indicative of an error in controlling the object avatar based on the one or more parameters extracted from the one or more utterances of the user 104. The control passes to end step 418.

At step 416, the processor 202 in conjunction with the avatar control unit 214 may perform the controlling of the one or more object avatars based on the extracted one or more parameters. The control passes to end step 418.

The disclosed methods and systems may be implemented on a conventional or a general-purpose computer system, such as a personal computer (PC) or server computer. Referring now to FIG. 5, a block diagram of an exemplary computer system 501 for implementing embodiments consistent with the present disclosure is illustrated. Variations of computer system 501 may be used for implementing network environment 100 for transmitting data over a communication network. Computer system 501 may include a central processing unit ("CPU" or "processor") 502. Processor 502 may include at least one data processor for executing program components for executing user- or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD ATHLON, DURON or OPTERON, ARM's application, embedded or secure processors, IBM POWERPC, INTEL'S CORE, ITANIUM, XEON, CELERON or other line of processors, etc. The processor 502 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 502 may be disposed in communication with one or more input/output (I/O) devices via I/O interface 503. The I/O interface 503 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-VIDEO, VGA, IEEE 802.n /b/g/n/x, BLUETOOTH, cellular (e.g., code-division multiple access (CDMA), high-speed packet access (HSPA+), global system for mobile communications (GSM), long-term evolution (LTE), WiMax, or the like), etc.

Using the I/O interface 503, the computer system 501 may communicate with one or more I/O devices. For example, the input device 504 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. Output device 505 may be a printer, fax machine, video display (e.g., cathode ray tube (CRT), liquid crystal display (LCD), light-emitting diode (LED), plasma, or the like), audio speaker, etc. In some embodiments, a transceiver 506 may be disposed in connection with the processor 502. The transceiver may facilitate various types of wireless transmission or reception. For example, the transceiver may include an antenna operatively connected to a transceiver chip (e.g., TEXAS INSTRUMENTS WiLink WL1283, BROADCOM BCM4750IUB8, INFINEON TECHNOLOGIES X-GOLD 618-PMB9800, or the like), providing IEEE 802.11a/b/g/n, BLUETOOTH, FM, global positioning system (GPS), 2G/3G HSDPA/HSUPA communications, etc.

In some embodiments, the processor 502 may be disposed in communication with a communication network 508 via a network interface 507. The network interface 507 may communicate with the communication network 508. The network interface may employ connection protocols including, without limitation, direct connect, ETHERNET (e.g., twisted pair 10/100/1000 Base T), transmission control protocol/internet protocol (TCP/IP), token ring, IEEE 802.11a/b/g/n/x, etc. The communication network 508 may include, without limitation, a direct interconnection, local area network (LAN), wide area network (WAN), wireless network (e.g., using Wireless Application Protocol), the Internet, etc. Using the network interface 507 and the communication network 508, the computer system 501 may communicate with devices 509, 510, and 511. These devices may include, without limitation, personal computer(s), server(s), fax machines, printers, scanners, various mobile devices such as cellular telephones, smartphones (e.g., APPLE IPHONE, BLACKBERRY, ANDROID-based phones, etc.), tablet computers, eBook readers (AMAZON KINDLE, NOOK, etc.), laptop computers, notebooks, gaming consoles (MICROSOFT XBOX, NINTENDO DS, SONY PLAYSTATION, etc.), or the like. In some embodiments, the computer system 501 may itself embody one or more of these devices.

In some embodiments, the processor 502 may be disposed in communication with one or more memory devices (e.g., RAM 513, ROM 514, etc.) via a storage interface 512. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

The memory devices may store a collection of program or database components, including, without limitation, an operating system 516, user interface application 517, web browser 518, mail server 519, mail client 520, user/application data 521 (e.g., any data variables or data records discussed in this disclosure), etc. The operating system 516 may facilitate resource management and operation of the computer system 501. Examples of operating systems include, without limitation, APPLE MACINTOSH OS X, UNIX, UNIX-like system distributions (e.g., BERKELEY SOFTWARE DISTRIBUTION (BSD), FREEBSD, NETBSD, OPENBSD, etc.), LINUX DISTRIBUTIONS (e.g., RED HAT, UBUNTU, KUBUNTU, etc.), IBM OS/2, MICROSOFT WINDOWS (XP), VISTA/7/8, 10 etc.), APPLE 10S, GOOGLE™ ANDROID™, BLACKBERRY OS, or the like. User interface 517 may facilitate display, execution, interaction, manipulation, or operation of program components through textual or graphical facilities. For example, user interfaces may provide computer interaction interface elements on a display system operatively connected to the computer system 501, such as cursors, icons, check boxes, menus, scrollers, windows, widgets, etc. Graphical user interfaces (GUIs) may be employed, including, without limitation, APPLE MACINTOSH OPERATING SYSTEMS' AQUA, IBM OS/2, MICROSOFT WINDOWS (E.G., AERO, METRO, ETC), WEB INTERFACE LIBRARIES (E.G., ACTIVEX, JAVA, JAVASCRIPT, AJAX, HTML, ADOBE FLASH, ETC.), OR THE LIKE.

In some embodiments, the computer system 501 may implement a web browser 518 stored program component. The web browser may be a hypertext viewing application, such as MICROSOFT INTERNET EXPLORER, GOOGLE CHROME, MOZILLA FIREFOX, APPLE SAFARI, etc. Secure web browsing may be provided using HTTPS (secure hypertext transport protocol), secure sockets layer (SSL), Transport Layer Security (TLS), etc. Web browsers may utilize facilities such as AJAX, DHTML, ADOBE FLASH, JAVASCRIPT, JAVA, application programming interfaces (APIs), etc. In some embodiments, the computer system 501 may implement a mail server 519 stored program component. The mail server may be an Internet mail server such as Microsoft Exchange, or the like. The mail server may utilize facilities such as ASP, ACTIVEX, ANSI C++/C#, MICROSOFT, .NET, CGI SCRIPTS, JAVA, JAVASCRIPT, PERL, PHP, PYTHON WEBOBJECTS, etc. The mail server may utilize communication protocols such as Internet message access protocol (IMAP), messaging application programming interface (MAPI), Microsoft Exchange, post office protocol (POP), simple mail transfer protocol (SMTP), or the like. In some embodiments, the computer system 501 may implement a mail client 520 stored program component. The mail client may be a mail viewing application, such as APPLE MAIL, MICROSOFT ENTOURAGE, MICROSOFT OUTLOOK, MOZILLA THUNDERBIRD, and the like.

In some embodiments, computer system 501 may store user/application data 521, such as the data, variables, records, etc. (e.g., past ticket repository, keywords, Ngrams, clusters or categories, relationship mapping, user queries, resolutions, and so forth) as described in this disclosure. Such databases may be implemented as fault-tolerant, relational, scalable, secure databases such as ORACLE or SYBASE. Alternatively, such databases may be implemented using standardized data structures, such as an array, hash, linked list, struct, structured text file (e.g., XML), table, or as object-oriented databases (e.g., using OBJECTSTORE, POET, ZOPE, etc.). Such databases may be consolidated or distributed, sometimes among the various computer systems discussed above in this disclosure. It is to be understood that the structure and operation of the any computer or database component may be combined, consolidated, or distributed in any working combination.

As will be appreciated by those skilled in the art, the techniques described in the various embodiments discussed above provide for control of an object avatar on an object avatar controlling device, thereby rendering and controlling an object avatar by the inputs that may be provided by the user, Such an operation enables human like interaction with objects. Interactivity with the object avatar is enhanced, this is particularly desirable when the user wants to address problems in the real object or when the marketing executive wants to explain any feature of the object to a buyer.

Additionally, the techniques described in the various embodiments discussed above are based on the context of one or more utterances of the user. Such one or more user utterances enhance the usability of such devices. Further, the technique also populates the anticipated outcome on a real object. Hence, it extrapolates the working of the object.

The specification has described system and method for controlling an object avatar on an object avatar controlling device 102. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed, Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method of controlling an object avatar, the method comprising:
   receiving, by an object avatar controlling device, one or more utterances from one or more users;
   identifying, by the object avatar controlling device, one or more object avatars stored in an object avatar database, based on at least a context associated with the one or more utterances, wherein the object avatar database comprises one or more permissible outcomes corresponding to a set of parameters for controlling the one or more object avatars;
   extracting, by the object avatar controlling device, one or more parameters to be used for controlling the one or more object avatars, from the one or more utterances;

determining, by the object avatar controlling device, based on a vector classification of the one or more parameters and the set of parameters, one or more outcomes of controlling the one or more object avatars based on the one or more parameters; and controlling, by the object avatar controlling device, the one or more object avatars based on the one or more parameters, when the one or more outcomes correspond to the one or more permissible outcomes, wherein the controlling comprises looking up the object avatar database to determine if the one or more outcomes correspond to the one or more permissible outcomes, and wherein the one or more permissible outcomes indicate outcomes that are permissible when populated on a real object related to a corresponding object avatar.

2. The method as claimed in claim 1, wherein the object avatar database further comprises one or more object avatar specification, the set of parameters, and one or more relationships among a plurality of object avatars from the one or more object avatars.

3. The method as claimed in claim 1, wherein the object avatar database is updated with one or more new object avatars based on multimedia provided by an administrative user.

4. The method as claimed in claim 3, wherein the one or more permissible outcomes are updated with one or more additionally permissible outcomes based on a set of new parameters provided by the administrative user.

5. The method as claimed in claim 1, wherein the identification and extraction comprises parsing the one or more utterances based on Natural Language Processing (NLP) technique.

6. The method as claimed in claim 1, further comprises generating one or more notifications indicative of an error in rendering of the one or more object avatars for the one or more users, when the one or more outcomes do not correspond to the one or more permissible outcomes.

7. The method as claimed in claim 1, further comprising rendering the one or more object avatars on a user interface (UI), based on the one or more parameters.

8. The method as claimed in claim 7, wherein rendering the one or more object avatars comprises transitioning the object avatar from a 2-dimensional (2D) UI to a 3-dimensional (3D) UI and vice versa, based on one or more pre-defined gestures performed by the one or more users on the 2D UI or the 3D UI.

9. A system for controlling an object avatar, the system comprising:
   a processor; and
   a memory communicatively coupled to the processor, wherein the memory stores processor executable instructions, which on execution causes the processor to:
      receive one or more utterances from one or more users;
      identify one or more object avatars stored in an object avatar database, based on at least a context associated with the one or more utterances, wherein the object avatar database comprises one or more permissible outcomes corresponding to a set of parameters for controlling the one or more object avatars;
      extract one or more parameters to be used for controlling the one or more object avatars, from the one or more utterances;
      determine, based on a vector classification of the one or more parameters and the set of parameters, one or more outcomes of controlling the one or more object avatars based on the one or more parameters; and
      control the one or more object avatars based on the one or more parameters, when the one or more outcomes correspond to the one or more permissible outcomes, wherein the controlling comprises looking up the object avatar database to determine if the one or more outcomes correspond to the one or more permissible outcomes, and wherein the one or more permissible outcomes indicate outcomes that are permissible when populated on a real object related to a corresponding object avatar.

10. The system as claimed in claim 9, wherein the object avatar database further comprises one or more object avatar specification, the set of parameters, and one or more relationships among a plurality of object avatars from the one or more object avatars.

11. The system as claimed in claim 9, wherein the processor is configured to update the object avatar database with one or more new object avatars based on multimedia provided by an administrative user.

12. The system as claimed in claim 11, wherein the processor is configured to update the one or more permissible outcomes with one or more additionally permissible outcomes based on a set of new parameters provided by the administrative user.

13. The system as claimed in claim 9, wherein the identification and extraction comprises parsing the one or more utterances based on Natural Language Processing (NLP) technique.

14. The system as claimed in claim 9, wherein the processor is further configured to generate one or more notifications indicative of an error in rendering of the one or more object avatars for the one or more users, when the one or more outcomes do not correspond to the one or more permissible outcomes.

15. The system as claimed in claim 9, wherein the processor is further configured to render the one or more object avatars on a user interface (UI), based on the one or more parameters.

16. The system as claimed in claim 15, wherein rendering the one or more object avatars comprises transitioning the object avatar from a 2-dimensional (2D) UI to a 3-dimensional (3D) UI and vice versa, based on one or more pre-defined gestures performed by the one or more users on the 2D UI or the 3D UI.

17. A non-transitory computer-readable medium storing one or more instructions for controlling an object avatar, wherein upon execution of the instructions by one or more processors, the one or more processors perform one or more operations comprising:
   receiving one or more utterances from one or more users;
   identifying one or more object avatars stored in an object avatar database, based on at least a context associated with the one or more utterances, wherein the object avatar database comprises one or more permissible outcomes corresponding to a set of parameters for controlling the one or more object avatars;
   extracting one or more parameters to be used for controlling the one or more object avatars, from the one or more utterances;
   determining based on a vector classification of the one or more parameters and the set of parameters, one or more outcomes of controlling the one or more object avatars based on the one or more parameters; and
   controlling the one or more object avatars based on the one or more parameters, when the one or more outcomes correspond to the one or more permissible outcomes, wherein the controlling comprises looking up the object avatar database to determine if the one or more outcomes correspond to the one or more permissible outcomes, and wherein the one or more permissible outcomes indicate outcomes that are permissible when populated on a real object related to a corresponding object avatar.

18. The computer-readable medium as claimed in claim 17, wherein the one or more operations comprise updating the object avatar database with one or more new object avatars based on multimedia provided by an administrative user, and the one or more permissible outcomes with one or more additionally permissible outcomes based on a set of new parameters provided by the administrative user.

19. The computer-readable medium as claimed in claim 17, wherein the one or more operations further comprise generating one or more notifications indicative of an error in rendering of the one or more object avatars for the one or more users, when the one or more outcomes do not correspond to the one or more permissible outcomes.

20. The computer-readable medium as claimed in claim 17, wherein the one or more operations further comprise: rendering the one or more object avatars on a user interface (UI), based on the one or more parameters, and wherein the rendering of the one or more object avatars comprises transitioning the object avatar from a 2-dimensional (2D) UI to a 3-dimensional (3D) UI and vice versa, based on one or more pre-defined gestures performed by the one or more users on the 2D UI or the 3D UI.

* * * * *